(12) United States Patent
Jones et al.

(10) Patent No.: US 6,233,661 B1
(45) Date of Patent: May 15, 2001

(54) COMPUTER SYSTEM WITH MEMORY CONTROLLER THAT HIDES THE NEXT CYCLE DURING THE CURRENT CYCLE

(75) Inventors: Phillip M. Jones, Spring; Gary J. Piccirillo, Cypress, both of TX (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/069,458

(22) Filed: Apr. 28, 1998

(51) Int. Cl.[7] ................................. G06F 13/14
(52) U.S. Cl. ............................ 711/154; 711/105
(58) Field of Search .................... 711/105, 154, 711/167; 365/230.03

(56) References Cited

U.S. PATENT DOCUMENTS

| | | | |
|---|---|---|---|
| 5,634,073 | 5/1997 | Collins et al. | 395/825 |
| 5,666,494 * | 9/1997 | Mote, Jr. | 711/167 |
| 5,781,200 | 7/1998 | Lu et al. | 345/516 |
| 5,903,509 * | 5/1999 | Ryan et al. | 365/230.03 |
| 5,960,461 | 9/1999 | Frank et al. | 711/163 |
| 5,983,325 | 11/1999 | Lewchuk | 711/137 |
| 5,995,438 * | 11/1999 | Jeng et al. | 365/230.03 |

OTHER PUBLICATIONS

VLSI Digital Signal Processors by Vijay K. Madisetti (Georgia Institute of Technology) Chapter 3, pp. 61–63; Butterworth–Heinemann.

* cited by examiner

*Primary Examiner*—Kevin L. Ellis
(74) *Attorney, Agent, or Firm*—Conley, Rose & Tayon, P.C.

(57) ABSTRACT

A computer system includes a processor, a memory device, at least one expansion bus, and a bridge device coupling the processor, memory device, and expansion bus together. The bridge device preferably includes a memory controller that is capable of arbitrating among pending memory requests, and in certain situations, starting the next cycle while the current cycle is finishing. This allows executing at least two memory requests concurrently, thus improving bus utilization and retrieving and storing data in memory occurs more efficiently. The memory controller can start the next memory cycle during the current cycle when the next memory cycle will result in a page miss and a bank hit to a bank that is not associated with the most recently used (MRU) page. Further concurrent memory request execution is possible when the next cycle will be a page miss and bank miss.

15 Claims, 7 Drawing Sheets

COMPUTER SYSTEM WITH MEMORY CONTROLLER THAT HIDES THE NEXT CYCLE DURING THE CURRENT CYCLE

CROSS-REFERENCE TO RELATED APPLICATIONS

This case is related to co-pending patent application Ser. No. 09/069,515 filed Apr. 29, 1998 by Phillip Jones and Gary Piccirillo, and to co-pending patent application Ser. No. 09/047,876 filed Mar. 25, 1998 by Kenneth Chin, Jerome Johnson, Philip Jones, Robert Lester, Gary Piccirillo, and Jeffrey Stevens.

STATEMENT REGARDING FEDERALLY SPONSORED RESEARCH OR DEVELOPMENT

Not applicable.

BACKGROUND OF THE INVENTION

1. Field of the Invention

The present invention relates generally to a computer system and, more particularly, to a memory controller in a computer used to permit access to memory via a memory bus. Still more particularly, the invention relates to a memory controller that provides increased bandwidth on the memory bus.

2. Background of the Invention

Personal computers ("PC's") include a variety of interconnected components between which data and control information passes. Typically a computer includes a microprocessor, a non-removable storage device such as a hard disk drive, a graphics interface to a video monitor, and other components permitting an operator to perform a variety of activities such as word processing, spread sheet calculations, video games, etc.

The processor typically accesses data and/or software stored on a mass storage device. A typical microprocessor however is capable of receiving data or software from or providing data or software to a mass storage device much faster than the storage device is capable of providing or receiving the corresponding information. Often, a processor must access the same piece of data or the same software instruction of software multiple times. It thus is beneficial to expedite transfers of information to and from the processor.

To increase the speed at which the processor accesses and uses information (including data and/or software) stored on a storage device, PC's include random access memory ("RAM"). The computer's RAM memory generally comprises the computer's main working memory and includes one or more memory "chips" and typically an array of memory chips. A processor can access RAM much faster than it can access a mass storage device, such as a hard drive. The PC's main RAM memory functions as temporary storage for programs executed by the processor and data used by the processor. When the operator of the PC wishes to run a program stored on the hard disk drive, a copy of the requested program typically is transferred to the computer's main memory. Although the copy of the program is transferred from the hard disk to main RAM memory at the relatively slow transfer rate dictated by the hard disk, the processor can then retrieve each program instruction from main memory much faster than from the hard disk. In addition to the programs, a copy of any applicable data also is retrieved and placed in main RAM memory so that the processor can more rapidly access the data. The main RAM memory, however, is volatile meaning that once power is turned off to the memory chips, which occurs when the computer is turned of the memory contents are erased.

Improvements in computer system performance usually requires an evolution of both software and hardware. Thus software and hardware development are interrelated. That is, software designers continue to develop more sophisticated software that takes advantage of faster computers. Similarly, computer designers continue to develop computers that operate faster to be able to run newer, more sophisticated software. Thus, it is desirable for a computer designer to improve the speed at which the computer operates to be able to run software faster. The computer's operational speed is determined by a number of factors including the speed at which main RAM memory is accessed by a processor or other device needing memory access. Increasing memory access speed, or, alternatively stated, reducing memory access time, contributes to increasing the overall speed at which a computer performs desired tasks.

Computer industry participants have approached the problem of increasing the speed of memory access from two basic angles. First, DRAM manufacturers continually strive to produce faster memory chips. Whereas the access time of memory chips in the early 1990's was greater than 100 nanoseconds, today the access time is on the order of 60 nanoseconds. Future memory chips undoubtedly will be even faster. The second approach is to develop faster techniques through which the computer communicates with memory. The present invention focuses on the latter of these two approaches. The following brief description of a memory subsystem in a typical PC may help to fully understand and appreciate the advantages of the present invention.

A personal computer usually includes a memory controller, which may be a discrete chip or part of another chip that controls access to the computer's main RAM memory. The memory controller couples to the RAM by way of a memory bus, which generally comprises a plurality of digital data, address, and control lines. Accessing DRAM is generally a multi-step process performed by the memory controller. First, the memory controller "opens" an appropriate "bank" of memory and then opens an appropriate "page" within the bank. Once the desired page of memory is opened, the memory controller can access the desired byte or bytes of data within the page. The memory controller may store new data in place of the existing data in a step referred to as a "write cycle." Alternatively, the memory controller may read data from the memory in a step referred to as a "read cycle." After a read or write cycle, the memory controller then may "close" the page and bank of memory in preparation for the next read or write cycle.

One type of DRAM memory commonly used is synchronous dynamic random access memory ("SDRAM"). Unlike conventional DRAM synchronous DRAM uses a clock signal (a signal whose voltage repeatedly oscillates between two voltage levels) provided by the computer to control (or synchronize) the SDRAM's internal timing. Synchronous DRAM offers several advantages over conventional DRAM which does not run off of a clock signal. Generally, SDRAM is faster, offers improved testability, higher yields, and consumes less power than conventional DRAM. Like conventional DRAM, accessing SDRAM involves multiple steps initiated by well-known commands such as "activate," "read/write," "precharge," and other commands. An "activate" command opens, or "activates," the desired bank and page of memory. A "read/write" command enables the memory controller to read data from or write data to the SDRAM. The bank and page opened by the "activate"

command can be closed by issuing a "precharge" command. The memory controller issues the activate, read/write, and precharge commands to the SDRAM.

Traditionally, a memory controller only opens one page of memory in a bank at a time. Thus, if a current memory request, be it a read or write cycle, is to page x in a bank and the next pending memory request is to page y in the same bank, page x first is closed, or precharged, before the next memory cycle to page y is started. FIG. 1 illustrates this process in which two memory write cycles, cycles A and B, are shown in a timeline. Write cycle A begins with the memory controller issuing an activate command to activate the memory bank and page where the write data of cycle A is to be stored. The data then is provided to the SDRAM when the memory controller issues a write command. Assuming the data pertaining to the next write cycle, cycle B, is destined for a page or bank different from that of write cycle A, the traditional memory controller precharges the bank associated with write cycle A before starting the activate command for write cycle B. This process results in a period of time, indicated by reference number 20, between the write commands of each write cycle A and B in which no data is being transferred on the memory bus between the memory controller and the SDRAM. Period of time 20 represents "dead time" because the memory bus is not used to transfer data between memory controller and main memory. It is desirable to minimize, if not eliminate, the dead time 20 on a memory bus, because doing so maximizes the percentage of time during which data is transmitted across the bus.

It would thus be advantageous to design a memory controller for a computer system that maximizes the percentage of time data is being transferred across the memory bus. A computer with such a memory controller would generally operate faster (or have a greater "bandwidth") because more data could be transferred to and from the main memory in less time than previously possible. Alternatively stated, the same amount of information could be transferred in less time, thus permitting the computer to execute software faster than possible with prior computer systems.

SUMMARY OF THE INVENTION

The deficiencies of the prior art described above are solved in large part by a computer system including a processor, a memory device, at least one expansion bus, and a bridge device coupling the processor, memory device, and expansion bus together. The bridge device preferably includes a memory controller capable of arbitrating among pending memory requests, and in certain situations, executing at least two memory requests concurrently. The execution of concurrent requests means that a subsequent request begins executing before completion of a previous request. The memory controller may run a memory precharge or activate cycle while concurrently writing data to or reading data from memory.

The memory controller generally includes page hit logic that determines whether the current or next memory request will result in a page "hit" or "miss" and a bank "hit" or "miss" condition. A bank (or page) hit condition means the memory address associated with the memory request matches the bank (or page) address associated with a recent memory request (i.e., bank or page that is already open). Conversely, a miss condition means the bank (or page) of the request does not match a bank (or page) already open. The memory controller also includes least recently used (LRU) logic that keeps track of the n previously used or accessed memory pages and banks.

The memory controller can execute two memory requests concurrently when the next memory request to be executed will result in a bank miss and the LRU logic is currently tracking its maximum number of open memory pages and banks. Alternatively or additionally, the memory controller also concurrently executes two memory requests when the next memory request will result in a page miss/bank miss or a page miss and not a bank hit to a bank associated with the most recently used (MRU) page. Further, concurrent memory request execution is possible when a bank inactivate condition is valid for the currently executing memory request and the next request to execute will result in a page miss or a page hit to a page other than the MRU page.

A bank inactivate condition involves a read or write request to a bank and page of memory that preferably is closed following the cycle rather than keeping it open. Although it is generally desirable to keep a page and bank open in case another access to that same page is needed, for certain types of cycles, such as reads of data as opposed to reads of code, it is unlikely that a subsequent access to that same page will occur. Thus, the computer system permits certain types of memory requests to be designated as requiring their banks and page to be closed (ie., inactivated) following execution of the request.

The bridge also preferably includes queue storage elements which permits write requests to memory to be temporarily stored pending execution by the memory controller. The memory controller thus can arbitrate among the pending write requests posted to the write queues and/or pending read requests and determine which memory request to execute next. This decision is made before the current cycle completes. If the next request results in one of three conditions described above, or any other suitable condition, the next memory request preferably begins before the current request completes. Thus, the memory controller takes less total time to execute both memory requests because at least a portion of the two requests generally execute at the same time.

BRIEF DESCRIPTION OF THE DRAWINGS

A better understanding of the present invention can be obtained when the following detailed description of the preferred embodiment is considered in conjunction with the following drawings in which.

DETAILED DESCRIPTION OF PREFERRED EMBODIMENTS

Figure 1:
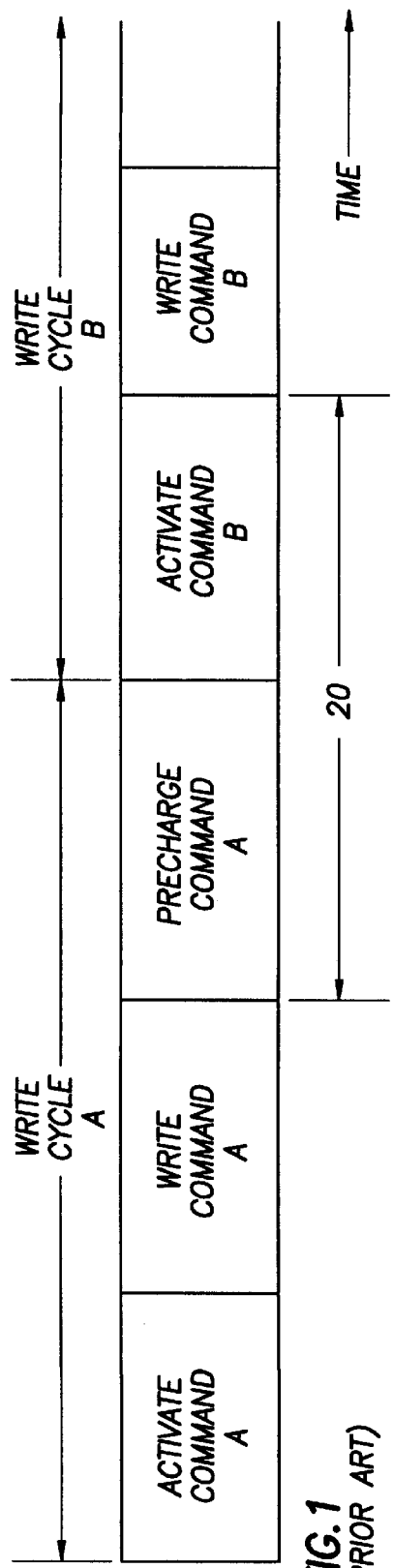
FIG. 1 is a timeline of a prior art computer system illustrating the order in which the various portions of multiple memory cycles are executed.
Figure 2:
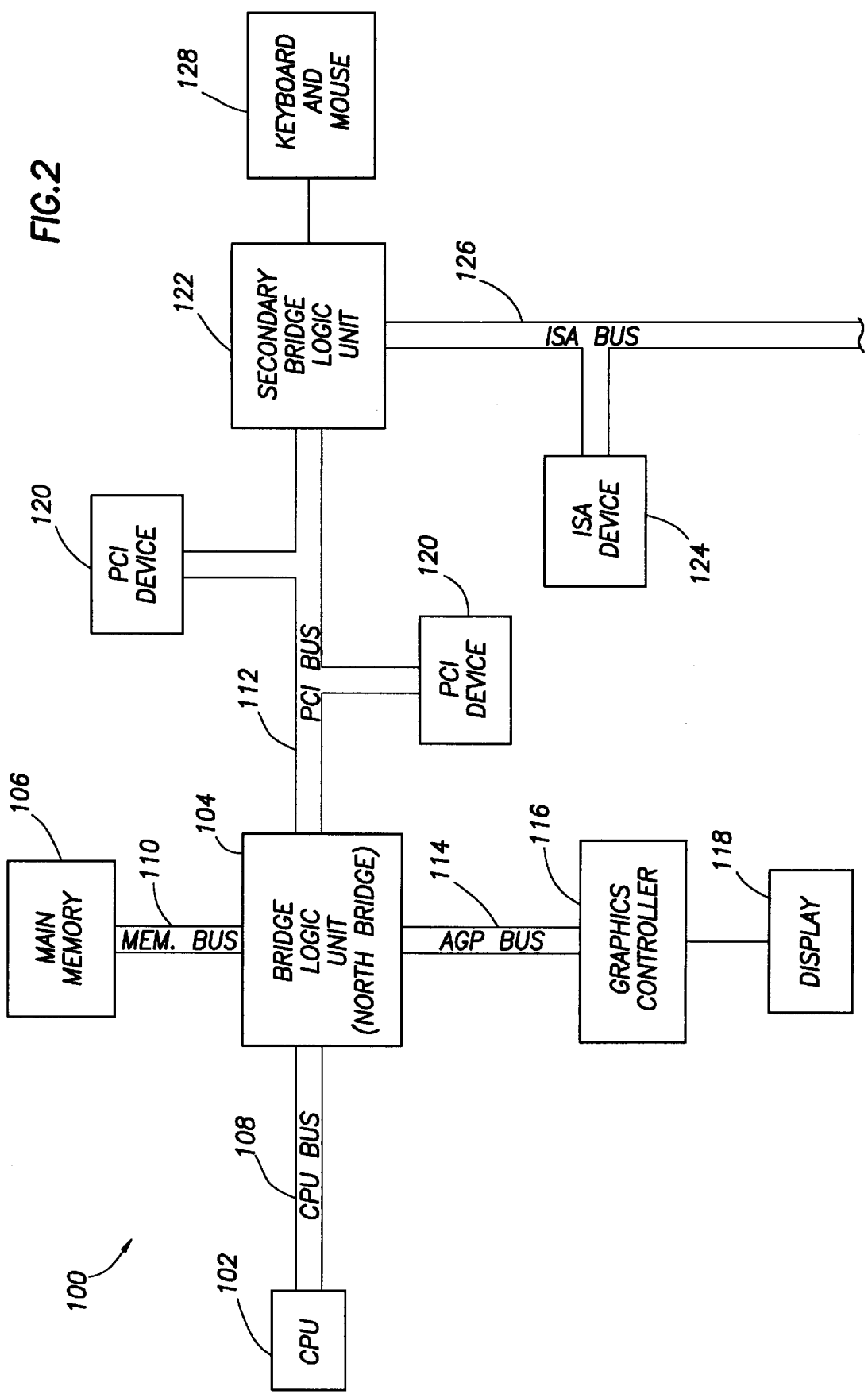
FIG. 2 is a block diagram of a computer system in accordance with a preferred embodiment including an integrated bridge logic unit.

Referring now to FIG. 2, a computer system 100 constructed in accordance with a preferred embodiment generally includes a central processing unit ("CPU") 102 coupled to a variety of system components through an integrated bridge logic unit (or "North bridge") 104. The CPU 102 preferably couples to the North bridge 104 via a CPU bus 108. As shown in the preferred embodiment of FIG. 1, a system main memory 106 also couples to the bridge logic unit 104 through a memory bus 110, and a graphics controller 116 couples to the bridge logic unit 104 through a graphics bus 114 which preferably is an Advanced Graphics Port ("AGP") or other suitable bus. The graphics controller 116 couples to a display device (or monitor) 118. Additionally, one or more Peripheral Component Interconnect ("PCI") devices 120 couple to the North bridge logic unit 104 through a PCI bus 112. Other standard bus protocols, besides PCI, may alternatively be used to implement bus 112. In addition, the graphics processor 108 may reside on the PCI bus 112 instead of a separate graphics bus 114. In accordance with generally known techniques, the North bridge 104 preferably coordinates the transfer of address, data, and control signals between the various busses to which it connects.

As will be explained in detail below, the invention generally represents a memory controller included as part of the North bridge 104 and provides the interface between main memory 106 and the rest of the devices in computer system 100. Although a bridge unit is preferred for interfacing the CPU 102, main memory 106, the AGP bus 114, and the PCI bus 112, the invention does not require a bridge logic unit. Further, the memory controller of the invention need not be included as a part of the North bridge 104. The memory controller described below is intended to be used to improve the efficiency of data transfer across memory bus 110 coupling the memory controller to main memory 106 regardless of the configuration of computer system 100.

Referring still to FIG. 2, the CPU 102 may be thought of as the "brains" of the computer system 100. Preferably, CPU 102 is illustrative of, for example, a Pentium®, Pentium® Pro, or Pentium® Pro II microprocessor. It should be understood, however, that other alternative types of microprocessors could be employed from a variety of manufacturers. Further, an embodiment of computer system 100 may include a multiple CPU architecture, with a plurality of processors coupled through the CPU bus 108 to the North bridge logic unit 104.

The system memory 106 generally includes a conventional memory device or an array of memory devices in which application programs and data are stored. The system memory 106 preferably comprises the working memory for the computer system. Computer system 100 includes any suitable type of memory such as dynamic random access memory ("DRAW") or specialized types of DRAM devices such as synchronous dynamic random access memory ("SDRAM") or extended data out DRAM ("EDO DRAM").

The graphics controller 116 controls the rendering of text and images on display 118. Graphics controller 116 may embody a typical graphics accelerator generally known in the art to render three-dimensional data structures on display 118. The graphics controller 116 effectively shifts these data structures into an out of main memory 106. The graphics controller 116 therefore may be a master of the graphics bus 114 in that it can request and receive access to the North bridge logic unit 104 to thereby obtain access to main memory 106. A dedicated graphics bus 114 accommodates rapid retrieval of data from main memory 106. The display 118 comprises any electronic display device for representing images and text. A suitable display 118 may include, for example, a cathode ray tube ("CRT"), a liquid crystal display ("LCD"), a thin film transistor ("TFT"), or a virtual retinal display ("VRD"), or any other type of suitable display device for a computer system.

The PCI peripheral devices 120 depicted in FIG. 1 may include any of a variety of peripheral devices such as, for example, network interface cards ("NIC's"), video accelerators, audio cards, small computer systems interface ("SCSI") adapters and telephony cards. Although only two PCI device 120 are included in the embodiment illustrated in FIG. 2, it should be recognized that computer system 100 may include any number of PCI devices as desired. As noted above, other buses may be used in place of a PCI bus 112. In such a case and as one skilled in the art will understand, peripheral devices 116 should be compatible with whatever bus protocol is used for bus 112.

Referring still to FIG. 1, a secondary bridge logic (or "South bridge") unit 122 also may be provided to accommodate an electrical interface between the North bridge 104 and one or more additional peripheral devices 124 residing on expansion bus 126. Thus, the South bridge 122 permits devices coupled to the North bridge to communicate with devices on the expansion bus 126. The expansion bus 126 may be implemented using any suitable bus type such as an Industry Standard Architecture ("ISA") bus or an Extended Industry Standard Architecture bus ("EISA"). An exemplary ISA device 124 is shown in FIG. 2 as representative of any number of ISA peripheral devices such as a modem. The ISA peripheral device 124 communicates over the ISA bus 126 and complies with the ISA bus standard protocol. It should be understood, however, that if a bus protocol other than ISA is used as expansion bus 126, the ISA device 124 should be replaced with a device compatible with the bus protocol used. The South bridge 122 preferably functions as a bus bridge for orchestrating the transfer of address, data and control signals between busses that implement different protocols, such as PCI bus 112 and ISA bus 126.

In addition to providing an interface to an expansion bus, South bridge logic 122 may further incorporate additional functionality, as desired. For example, in one embodiment South bridge logic unit 122 includes a master PCI arbiter (not specifically shown) for arbitrating ownership of the PCI bus 112. An arbiter grants mastership of the bus to one of the devices requesting access to the bus. Secondary bridge logic unit 116 may also incorporate a disk drive controller, an interrupt controller, and power management support functionality. An input/output controller (not shown), either external from or integrated with the secondary bridge logic unit 122, may also be included within computer system 100 to provide operational support for a keyboard and mouse 128 and for various serial and parallel ports, as desired.

As shown, the computer system 100 illustrated in FIG. 2 includes a number of devices that can access main memory 106. For example, the CPU 102, graphics controller 116, PCI devices 120, and ISA device 124 all can write and read data to and from main memory 106. Further, these devices may desire concurrent access to memory. To accommodate multiple concurrent memory requests, the North bridge 104 preferably includes storage capacity to temporarily store memory requests from devices external to North bridge 104.

Figure 3:
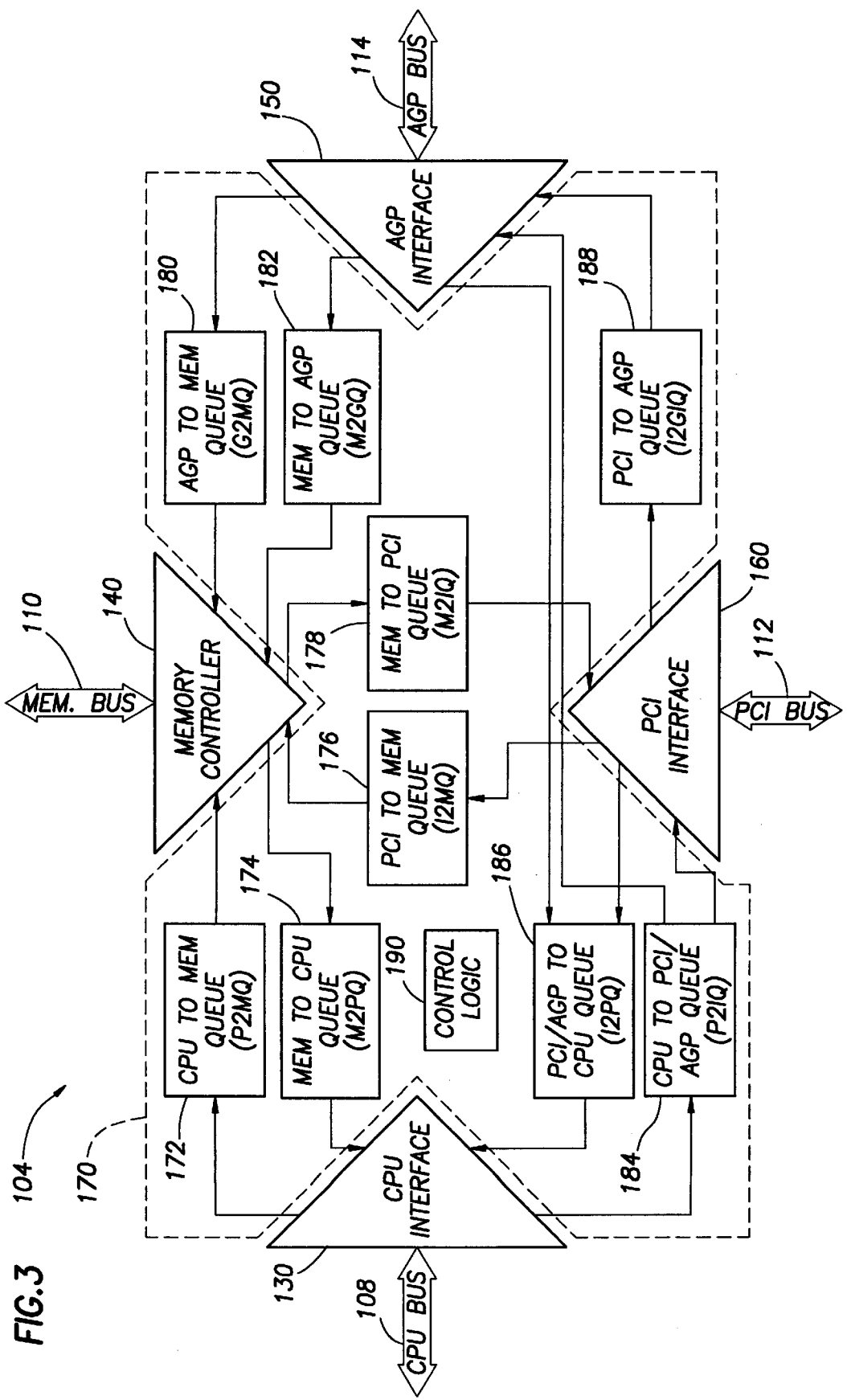
FIG. 3 is a block diagram of a preferred embodiment of the bridge logic unit of FIG. 2 including CPU, PCI, and AGP interfaces, a memory controller, and data and address queues between the interfaces and memory controller.
Figure 4A:
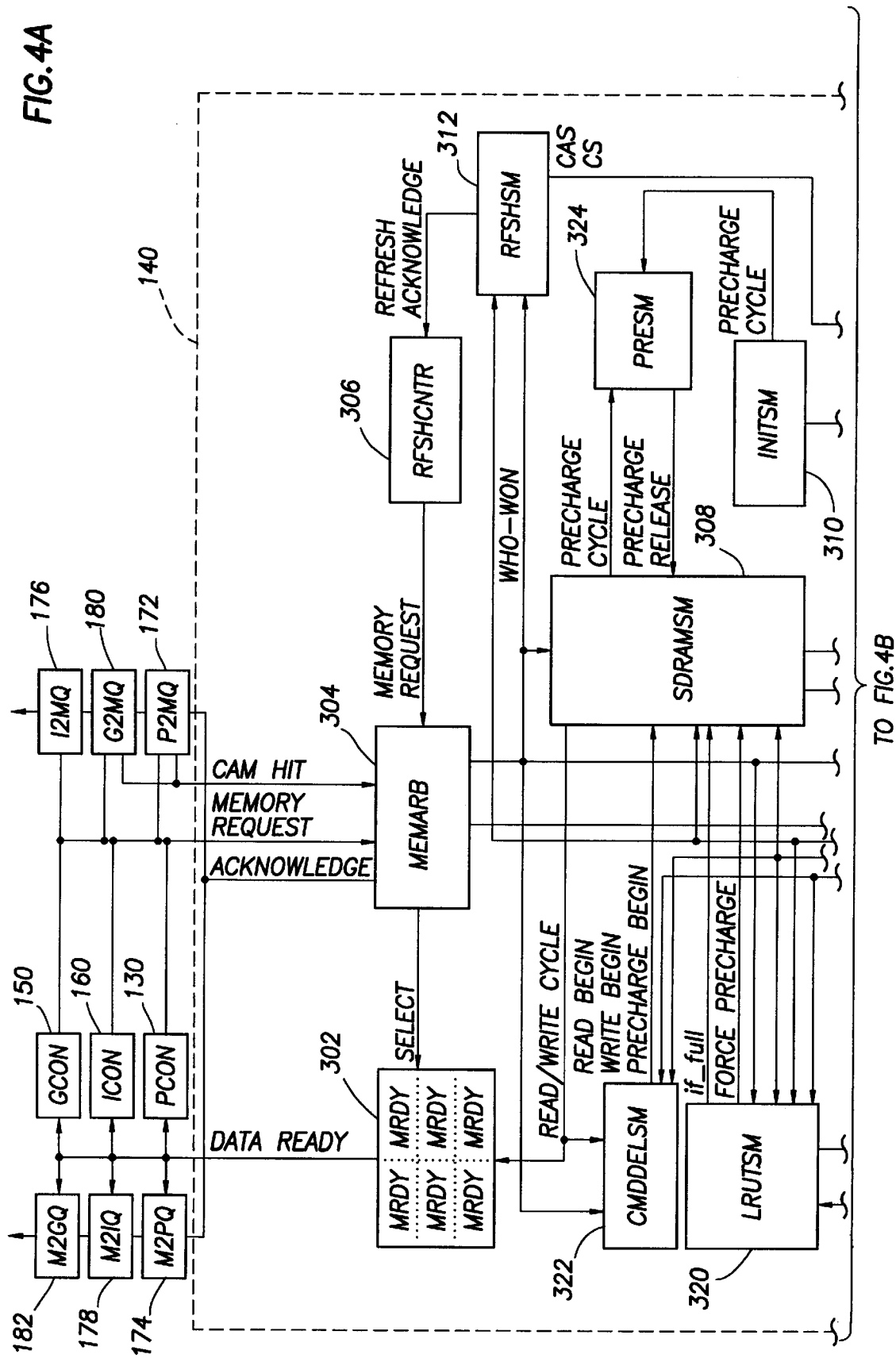
FIG. 4 is a detailed block diagram of the memory controller of FIG. 3.
Figure 4B:
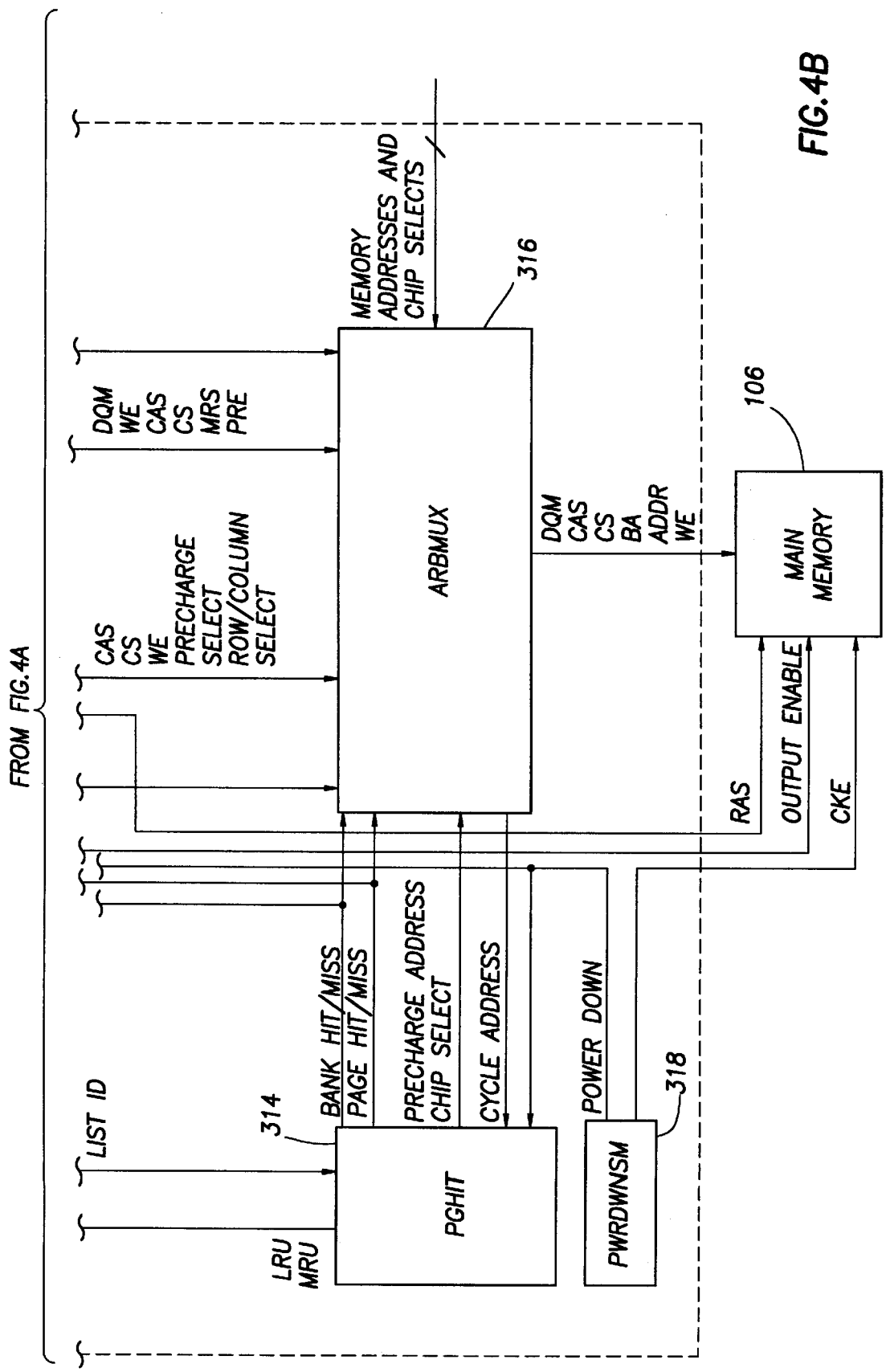

The memory controller contained within the North bridge 104 services (i.e., performs) the pending memory requests according to an order determined by a suitable protocol. The memory controller in North bridge 104 includes a memory arbiter to decide which pending request to service next. Thus, as the memory controller in the North bridge 104 services one memory request, there may be one or more additional memory requests stored in the North bridge 104 waiting to be serviced by the memory controller. The memory controller permits the memory requests to run, at least partially, concurrently to service as many memory requests in as short a period of time as possible. FIGS. 3 and 4 illustrate an exemplary embodiment of North bridge 104 (FIG. 3) and more particularly the memory controller (FIG. 4) within the North bridge.

Before proceeding further to discuss in detail the memory controller of the North bridge 104, it is important to bear in mind that the major thrust of the invention is to expedite multiple pending memory requests. It is thus irrelevant to the memory controller whether the memory controller is included as part of the bridge device 104 or is included as part of another device or is implemented as a discrete device. Further, the memory controller of the invention is useful even if only the CPU 102, and no other device, requires memory access. In accordance with the preferred embodiment, however, computer system 100 includes a North bridge 104 to permit multiple devices access to main memory 106 and the memory controller is included within the bridge 104.

Referring now to FIG. 3, bridge logic unit 104 generally includes a CPU interface 130, a memory controller 140, an AGP interface 150, a PCI interface 160, and queue storage and control logic 170. As shown, the CPU interface 130 preferably couples the bridge logic unit 104 to the CPU bus 108 and also coordinates the transfer of data, address and control signals between the bridge logic 104 and CPU bus 108. The AGP interface 150 and PCI interface 160 in similar fashion interface the bridge logic 104 to the AGP bus 114 and PCI bus 112, respectively. Finally, the memory controller 140 couples North bridge 104 to the memory bus 110 and communicates with main memory 106 (FIG. 2).

The queue storage and control logic 170 includes various queue storage elements interconnecting the CPU interface 130, memory controller 140, AGP interface 150, and PCI interface 160. These queue storage elements provide the temporary storage capacity for memory requests referred to previously. Referring still to FIG. 3, a CPU-to-memory queue (P2MQ) 172 and a memory-to-CPU queue (M2PQ) 174 couple the CPU interface 130 to the memory controller 140. A PCI-to-memory queue (I2MQ) 176 and a memory-to-PCI queue (M2IQ) 178 couple the PCI interface 160 to the memory controller 140. An AGP-to-memory queue (G2MQ) 180 and a memory to AGP queue (M2GQ) 182 couple the AGP interface to the memory controller 140. The AGP interface 150 and the PCI interface 160 couple by way of a PCI to AGP queue (I2GIQ) 188. A CPU to PCI/AGP queue (P2IQ) 184 and a PCI/AGP to CPU queue (I2PQ) 186 couple the CPU interface 130 to the AGP interface 150 and the PCI interface 160 as shown. A control logic unit 190 controls the operation of the various queue storage elements. The input and output connections to the control logic unit 190 as well as the various control signals between the interfaces 130, 150, 160 and memory controller 140 have been omitted from FIG. 3 for sake of clarity, but are described in detail in a copending and commonly assigned application entitled "Computer System With Memory Controller and Bridge Interface Permitting Concurrent Operation."

Generally, the queue storage elements permit data and data transaction requests (such as CPU reads and writes to memory, PCI reads and writes to memory, etc.) to be temporarily stored pending execution by the destination device, thereby permitting the requesting device to perform other tasks until its transaction request is completed. Operation and storage of data transactions in the queue storage elements preferably occurs concurrently allowing data and data transaction requests among the interfaces 130, 150, 160 and the memory controller 140 to be stored within the bridge logic unit 104.

Concurrent storage of data and transaction requests in the queue storage elements 172, 174, 176, 178, 180, 182, 184, 186, and 188 means that each queue storage element can hold data and/or memory transaction requests at the same time. Thus each queue storage element can store data and/or requests independent of all other queue storage elements. By including queue storage elements between the interfaces 130, 150, 160 and memory controller 140 as shown in FIG. 3, and permitting each queue storage element to store data and transaction requests concurrently with all other queue storage elements, the performance of the computer system 100 can be improved. This improvement results from passing data and transaction requests between buses 108, 110, 112, 114 in a more efficient manner. Moreover, traffic between buses is handled more efficiently by maximizing the utilization rate of data paths between pairs of buses (i.e., the percentage of time data and transaction requests pass between one bus and another). For purposes of this disclosure, the terms "transaction" and "cycle" are generally used synonymously.

Each queue is generally a one-way device as indicated by the arrows connecting the queues to the interfaces 130, 150, 160 and memory controller 140. Some queues temporarily hold write requests and other queues temporarily hold read data. Write queues generally include P2MQ 172, I2MQ 176, G2MQ 180, P2IQ 184, and I2GIQ 188. Read queues include M2PQ 174, M2IQ 178, M2GQ 182, and I2PQ 186. Write queues store write requests initiated by a requesting interface (the interface that initiates the write request) before being provided to the target interface (the interface to which the write data is to be written). The read queues temporarily store data that has been produced by the target device of a read request before the read data is provided to the device that initiated the read request cycle. Because the invention relates primarily to memory read and write requests, P2MQ 172, M2PQ 174, I2MQ 176, M2IQ 178, G2MQ 180, and M2GQ 182 are more relevant than the other queue storage elements. Therefore, these queues are discussed in more detail below. The remaining queues, P2GIQ 184, I2PQ 186, and I2GIQ 188 are described in detail in co-pending application entitled "Computer System With Memory Controller and Bridge Interface Permitting Concurrent Operation" and reference may be made to that disclosure if desired.

Referring still to FIG. 3, the P2MQ 172, stores one or more write requests initiated by the CPU 102 for writing data to main memory 106. Similarly, I2MQ 176, and G2MQ 180 also store write request initiated by devices connected to the PCI bus 112 and AGP bus 114, respectively, for storing write data to main memory 106. Read requests preferably are not temporarily stored in queues, but are transferred directly to the memory controller 140 when the memory controller is prepared to service the outstanding read request. After the memory controller has serviced a read request from the CPU 102, the memory controller 140 transfers the data read from memory 106 to the M2PQ 174. From there the CPU interface 130 can de-queue the data from M2PQ 174 and provide the data to CPU. Similarly, in response to a memory read request from a PCI device 120 (FIG. 2), the memory controller 140 transfers data read from main memory 106 to M2IQ 178 or from the graphics controller 116 to M2GQ 182. For a more detailed explanation of transaction and data flow through North bridge 104, reference may be made to copending application entitled "Computer System With Memory Controller and Bridge Interface Permitting Concurrent Operation."

As should be apparent from the previous discussion, one result of concurrent cycle flow through bridge device 104 is that multiple requests for access to main memory 106 may be pending in North bridge 104 at any point in time. As stated, memory controller 140 incorporates a memory arbitration technique for deciding which of the pending memory cycles to execute next. That arbitration technique may be any technique suitable for efficiently processing memory cycles and preferably is the arbitration technique described in copending and commonly assigned applications entitled "Computer System With Adaptive Memory Arbitration Scheme." Using the arbitration scheme, the memory controller 140 may also decide which pending memory request to execute next while the current cycle is still executing. The memory controller 140 can "look ahead" to the next cycle to execute by determining if any write cycles are pending in queues 172, 176, or 180 or read cycles are pending from interfaces 130, 150, or 160. The ability of the memory controller 140 to look ahead to determine which pending memory cycle to execute next while still executing the current cycle permits the memory controller to execute portions of two different memory cycles concurrently, thereby reducing the overall time required to execute both cycles collectively. This aspect of memory controller 140 will be explained in detail with reference to FIGS. 4–6.

Referring now to FIG. 4, the memory controller 140 preferably includes a number of state machines comprising logic units whose output values depend on the state of the present input values as well as previous input values. The exemplary embodiment shown in FIG. 4 includes a memory ready state machine (MRDY) 302, a memory arbitration state machine (MEMARB) 304, a refresh counter logic (RFSHCNTR) 306, an SDRAM state machine (SDRAMSM) 308, an initialize state machine (INITSM) 310, a memory refresh state machine (RFSHSM) 312, a page hit logic (PGHIT) unit 314, an arbitration multiplexer (ARBMUX) 316, a power-down state machine (PWRDWNSM) 318, a least recently used tracker state machine (LRUTSM) 320, a command delay state machine (CMDDELSM) 322, and a precharge state machine (PRESM) 324. Each state machine in FIG. 4 couples to one or more other state machines or external interfaces, queues, or configuration registers. The connections between the various state machines, interfaces, and registers may either reflect actual signals or logical states or flags in accordance with known techniques.

The MEMARB state machine 304 receives memory request signals from the RFSHCNTR 306, CPU interface 130, AGP interface 150, the PCI interface 160, as well as the CPU-to-memory queue 172, the PCI to memory queue 176, and the AGP to memory queue 180. The MEMARB state machine 304 also receives CAM hit indicator signals (as explained in detail in copending application entitled "Computer System With Adaptive Memory Arbitration Scheme") from the CPU to memory queue 172 and from the AGP-to-memory queue 180. The MEMARB 304 implements any suitable memory arbitration scheme for deciding which one of multiple pending memory requests is to be serviced during the next memory cycle. Accordingly, in response to the memory request and CAM hit signals, MEMARB 304 asserts a who-won signal which identifies which pending memory request is to be serviced in the next memory cycle. The MEMARB 304 preferably provides the who-won signal to the SDRAMSM 308, CMDDELSM 322, RFSHSM 312, and ARBMUX 316.

If a read request wins memory arbitration, the MEMARB state machine 304 generates a select signal that activates an MRDY 302 associated with that read request. The MRDY 302 state machines determine how much time will pass between generation of the select signal and when the memory bus has valid read data (ie., CAS latency). When the read data is valid, the MRDY 302 asserts a data-ready signal to the memory to CPU queue 174, memory to PCI queue 178, memory to AGP queue 182, CPU interface 130, AGP interface 150, or PCI interface 160.

Referring still to FIG. 4, the SDRAMSM state machine 308 couples to the MEMARB 304, PGHIT 314, arbitration multiplexer (ARBMUX) 316, the LRUTSM 320, CMDDELSM 322, and the PRSESM 324 as shown. The SDRAM state machine 308 initiates activate, precharge, read, and write commands to the main memory 106 by asserting the RAS signal directly to the main memory 106 and generating and providing the CAS, CS, WE, precharge select, and row/column select signals to the ARBMUX 316. The RAS signal, along with the ARBMUX 316 output signals, identify the memory location associated with the current memory cycle request. The SDRAMSM 308 also transmits the read/write cycle indicator to the MRDY 302 and the CMDDELSM 322. The read/write cycle signal indicates whether the memory request selected by the MEMARB 304 is a read or write cycle. During a precharge cycle, SDRAMSM 308 asserts a precharge cycle indicator to the PRESM state machine 324. The PRESM 324 then waits until a predetermined amount of time has elapsed before asserting a precharge release indicator to SDRAMSM 308, permitting SDRAMSM 308 to begin the next Activate cycle.

In addition, at the beginning of a read or a write cycle, SDRAMSM 308 transmits a read/write cycle indicator to the CMDDELSM state machine 322. The CMDDELSM 322 then waits until a predetermined amount of time has elapsed before asserting the read begin, write begin, and precharge begin signals, which give permission for the SDRAMSM 308 to issue the next read, write, or precharge command, respectively. Using this technique in conjunction with the bank bit and page hit indicators that PGHIT 314 transmits to the LRUTSM 320, CMDDELSM 322, SDRAMSM 308 and ARBMUX 316, the CMDDELSM 322 and PRESM 324 allow SDRAMSM 308 to temporally separate and/or sustain read, write, and precharge commands. Accurate timing of these commands allows the memory controller 140 to properly couple with the main memory 106.

The INITSM 310 asserts the DQM, WE, CAS, CS, MRS, and PRE signals to ARBMUX 316. These signals are used by the ARBMUX to run cycles to main memory 106 during system initialization (i.e., boot-up). When the main memory 106 first powers on, it must undergo a special sequence of initialization commands that prepare it for operation. As would be understood by one of ordinary skill in the art, the INITSM state machine 310 generates the initialization command sequence via DQM, WE, CAS, CS, MRS, and PRE signals, which it delivers to ARBMUX 316. The ARBMUX 316 accordingly routes these signals from INITSM 310 to main memory 106.

The SDRAMSM 308 preferably asserts precharge cycle indicator signals to the PRESM state machine 324. The PRESM state machine 324 generally determines when the RAS precharge time has been met and asserts precharge release signal to the SDRAMSM 308 to let the SDRAMSM know that an activate command can be issued.

Main memory 106 must undergo a "refresh" process within a predetermined time interval following the previous refresh in order for the memory to maintain its data as is understood by one of ordinary skill in the art. Memory refresh cycles are controlled by the RFSHSM 312. Accordingly, the RFSHCNTR state machine 306 generates periodic refresh requests to MEMARB 304. First, the RFSHSM state machine 312 notifies RFSHCNTR 306 via the refresh acknowledge signal when RFSHSM 312 submits a particular refresh cycle to ARBMUX 316 for execution in main memory 106. Next, after waiting for the predetermined time interval, RFSHCNTR 306 broadcasts a refresh request to MEMARB 304 via a request signal. During the next available memory cycle, MEMARB 304 commands RFSHSM 312 via the who-won signal to submit the refresh cycle to ARBMUX 316. In response, the RFSHSM 312 then submits the request to ARBMUX 316 via CAS and CS signals and asserts the refresh acknowledge signal to alert RFSHCNTR 306 of the refresh cycle submission. The refresh request cycle is repeated at a rate sufficient to maintain the contents of main memory 106.

The ARBMUX 316 receives memory addresses from the CPU-to-memory queue (P2MQ) 172, the CPU interface 130, the PCI-to-memory queue (I2MQ) 176, the PCI interface 160, the AGP-to-memory queue (G2MQ) 180, and the AGP interface 150. The ARBMUX 316 provides a cycle address signal to the PGHIT 314, while generating data mask (DQM), column address strobe (CAS), chip select (CS), chip enable (CE), address (ADDR), and write enable (WE) signals to main memory 106.

In accordance with the preferred embodiment, the ARBMUX state machine 316 asserts the DQM, CAS, CS, CE, ADDR, and WE signals which open desired locations in main memory 106. First, ARBMUX 316 receives the who-won signal from MEMARB 304, indicating which memory cycle request has won arbitration. Depending on the arbitration winner, ARBMUX 316 translates the DQM, CAS, CS, CE, ADDR, and WE signals from either the CAS and CS signals provided by RFSHSM 312, the CAS, CS, WE, precharge select and row/column select signals generated by SDRAMSM 308, the precharge address and chip select from PGHIT 314, or the memory address signals produced by the P2MQ 172, the CPU interface, the I2MQ 176, the PCI interface, the G2MQ 180, or the AGP interface.

The PGHIT state machine 314 generally compares the memory address associated with the memory request selected by the MEMARB 304 to a list of recently used banks and pages of memory tracked by the LRUTSM 320 and provided to the PGHIT 314 via the list ID signals. If a match (also referred to as a "hit") exists to a currently open bank, PGHIT 314 asserts the bank hit/miss indicator signal preferably to a logic high state. If no match exists (a "miss") to a currently open bank, PGHIT 314 deasserts the bank hit/miss signal to a logic low state. Similarly, the PGHIT 314 determines if there is a hit to an open page and, accordingly, asserts the page hit/miss. The PGHIT 314 provides the bank hit/miss and page hit/miss signals to the SDRAMSM 308, ARBMUX 316, and LRUTSM 320. The LRUTSM 320 uses these hit/miss signals to adjust its list of recently used pages and banks.

The PGHIT 314 also determines if a cycle address is a hit to either the least recently used (LRU) page or most recently used (MRU) page. If either page is hit, the PGHIT 314 asserts either the LRU hit signal or MRU hit signal (depending on which is hit) to the LRUTSM 320 and to the ARBMUX 316. The LRUTSM state machine 320 asserts a force precharge signal and a LRU tracker full (lt_full) signal to SDRAMSM 308. The force precharge signal indicates that an open memory page must be precharged during the next memory cycle. The lt_full signal indicates that the LRUTSM 320 is currently tracking the maximum number of open pages for which it has been programmed. Finally, the PWRDWNSM 318 provides a CKE signal to main memory 106 as well as a power-down indicator to RFSHSM 312, SDRAMSM 308, PGHIT 314, and LRUTSM 320.

If the current memory cycle is a read cycle, the MRDY 302 associated with the current read cycle receives the read/write cycle indicator from SDRAMSM 308. A read/write cycle indicator instructs the MRDY 302 to notify its associated queue and interface, via its data-ready signal, that read data is available from main memory 106. There preferably is an MRDY 302 for each type of read cycle, and a single MRDY 302 couples with either the memory to CPU queue 174, memory to PCI queue 178, or memory to AGP queue 182, and also with either the CPU interface 130, AGP interface 150, or PCI interface 160.

The PWRDWNSM 318 controls the steps for powering down the logic associated with the bridge 104. The PWRDWNSM 318 provides a clock enable (CKE) signal to main memory 106 which allows main memory 106 to enter a power-down mode, thereby reducing energy consumption. When PWRDWNSM 318 deasserts CKE, PWRDWNSM 318 also sends a power-down indicator signal to RFSHSM 312, SDRAMSM 308, PGHIT 314, and LRUTSM 320 to signal these state machines that main memory 106 is unavailable.

Main memory 106 is generally organized in "banks" with multiple "pages" per bank as would be understood by one of ordinary skill in the art. Recently opened pages preferably remain open. The LRUTSM 320 keeps track of the most recently accessed pages to expedite additional accesses to those pages. Keeping a page open saves the set-up time that would be required to access that same page in a subsequent memory cycle. The LRUTSM 320 can track any number of recently accessed pages, but preferably tracks four or fewer pages. The number of pages that are tracked by the LRUTSM 320 preferably is programmable and may include 2, 3, or 4 pages.

Generally, if the LRUTSM 320 is "full" (i.e., it currently is tracking the maximum number of pages it has been programmed to track) and the next memory access is to a page that is not currently opened, the memory controller 140 must close one of the currently opened pages by issuing a precharge command so that the LRUTSM 320 continues to track the most recently used pages. In this situation, it may be desirable to close (or precharge) the recently used page being tracked by the LRUTSM 320. Regardless of which page is precharged, the precharge cycle takes a finite amount of time to complete. During that time, as illustrated in FIG. 1, the memory bus is not used to transfer data, thus reducing the bus efficiency. Accordingly, it is desirable to minimize or eliminate time in which the memory bus 110 is used to precharge memory without transferring data.

The present invention addresses this issue by providing a memory controller that is capable of executing at least two memory access requests concurrently. For example, the memory controller 140 may execute a precharge or activate command for one memory request cycle while executing another memory request. Concurrent execution of memory requests is possible in certain conditions. These conditions include:

(1) The next memory request would result in a bank miss condition and the LRU tracker LRUTSM 320) is full;

(2) The next memory request would result in a page miss/bank miss or a page miss and not a bank hit condition to a bank that is associated with the most recently used page; and (3) The bank inactivate condition is valid for the current cycle and the next memory request would result in a page miss or page hit to a page other than the most recently used page.

For condition (1) to be met, PGHIT 314 compares the memory address associated with the next memory access to be run and determine that the address does not correspond to any already open banks (a bank miss condition indicated by asserting the bank hit/miss signal), Further, the LRU tracker 314 must be full (as indicated by the lt_full signal) and thus no new banks can be activated without precharging an already opened bank. However, as will be explained in more detail below, the precharge step can wait until after the next memory cycle begins. In other words, the next memory cycle can begin and during that cycle one of the previously opened banks can be precharged. The SDRAMSM 308 determines when this condition is true and begins the next memory cycle.

The memory controller checks for two situations for conditions (2). The first situation is when the next cycle will result in a page miss/bank miss condition. In this situation, the Activate command for the next cycle can begin while the current cycle is still executing. The next situation is when the next cycle will result in a page miss and a bank hit to a bank not associated with the MRU page. In this latter situation, the precharge command for the next cycle can begin during the current cycle followed by an Activate and Read/Write command. In either case, the SDRAMSM 308 begins the next memory access before the current cycle completes.

Condition (3) involves a "bank inactivate" condition. For certain memory cycle types, a subsequent hit to the same bank and page is less likely to occur than for other cycle types. For example, once a memory location is accessed to retrieve data stored at that location, often that same data value will not have to be retrieved again. By contrast, software often includes "loops" of code instructions in which each instruction in a loop is executed two or more times, subsequent retrieval of the same software instruction is more likely to occur. To accommodate the desirability of always closing certain cycle types, the bank and page associated with each memory cycle type can be programmed to remain open or to close after the cycle is executed. Accordingly, computer system 100 includes a memory bank control register which may be located in the bridge logic unit 104, or elsewhere, by which each memory cycle type can be programmed to remain open or be closed upon execution. In the preferred embodiment, the memory bank control register preferably includes 16 bits defined below in Table I.

TABLE I

Memory Bank Control Register

| Bit Number | R/W | Bit Description |
| --- | --- | --- |
| 15–14 | R | Reserved |
| 13 | R/W | All Cycles Open:<br>0 = Close all Banks - Use Bits 12–0 |

TABLE I-continued

Memory Bank Control Register

| Bit Number | R/W | Bit Description |
| --- | --- | --- |
| | | 1 = Keep all Banks Open* - Ignore Bits 12–0 |
| 12 | R/W | P2M Virtual AGP:<br>0 = Keep the Bank Open on Completion*<br>1 = Close the Bank on Completion |
| 11 | R/W | P2M Non-Virtual AGP<br>0 = Keep the Bank Open on Completion*<br>1 = Close the Bank on Completion |
| 10 | R/W | M2P Code Read:<br>0 = Keep the Bank Open on Completion*<br>1 = Close the Bank on Completion |
| 9 | R/W | M2P Data Read:<br>0 = Keep the Bank Open on Completion*<br>1 = Close the Bank on Completion |
| 8 | R/W | M2PG<br>0 = Keep the Bank Open on Completion*<br>1 = Close the Bank on Completion |
| 7 | R/W | GI2M and data still in the Queue:<br>0 = Keep the Bank Open on Completion*<br>1 = Close the Bank on Completion |
| 6 | R/W | I2M and data still in the Queue:<br>0 = Keep the Bank Open on Completion*<br>1 = Close the Bank on Completion |
| 5 | R/W | M2I Read Multiple:<br>0 = Keep the Bank Open on Completion*<br>1 = Close the Bank on Completion |
| 4 | R/W | M2I Non-Read Multiple<br>0 = Keep the Bank Open on Completion*<br>1 = Close the Bank on Completion |
| 3 | R/W | M2GI Read Multiple<br>0 = Keep the Bank Open on Completion*<br>1 = Close the Bank on Completion |
| 2 | R/W | M2GI Non-Read Multiple<br>0 = Keep the Bank Open on Completion*<br>1 = Close the Bank on Completion |
| 1 | R/W | G2M and data still in the Queue:<br>0 = Keep the Bank Open on Completion*<br>1 = Close the Bank on Completion |
| 0 | R/W | M2G<br>0 = Keep the Bank Open on Completion*<br>1 = Close the Bank on Completion |

As shown in the preferred embodiment bit 13 can be set (logic 1) to indicate that the bank associated with a memory access should be kept open upon completion of the memory access. If 13 is 0, however, bits 0–12 identify whether a bank will be kept open or will be closed depending on the type of memory cycle. For example, if bit 10 is set to a logic 1 value, a page from which a software instruction is read will remain open upon completion of the read cycle.

If a bank inactivate condition is valid for the current memory cycle, the page associated with the cycle will be closed automatically following execution of the cycle before the next cycle is run. In condition (3), if the page associated with the next memory cycle results in a page miss or a page hit to a page other than the most recently used page (identified by the LRUTSM 320 via the MRU signal), the next cycle will begin before the current page is precharged. Further, the current page will be precharged, as explained below, while the next cycle is running.

Figure 5:
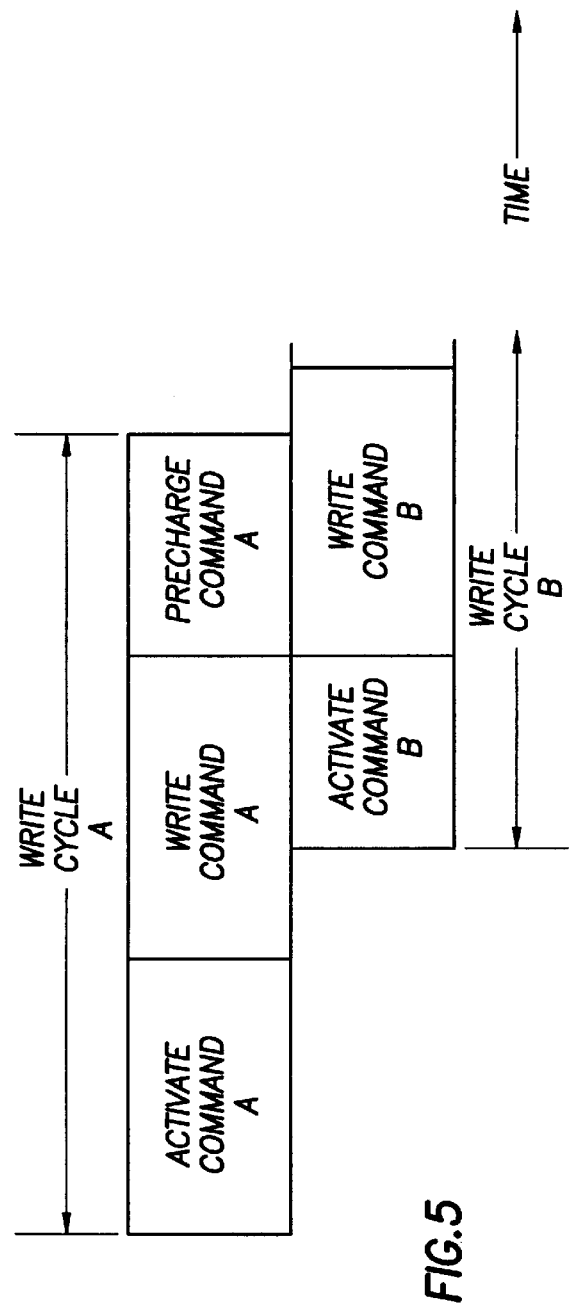
FIG. 5 is a timeline of the computer system of FIG. 2 illustrating the benefit of starting one or more steps of a memory cycle earlier than that permitted by the prior art timeline of FIG. 1.

If conditions (1) and (3) identified above are true, the next memory cycle will be initiated before a precharge command is issued by the ARBMUX 316 to main memory 106. Further, the precharge command will be issued while the next memory cycle is running so that the next memory cycle executes concurrently with the precharge command. FIG. 5 illustrates this principle conceptually in a timeline. In FIG. 5, two write cycles, A and B, are executed partially concurrently. If any of the three conditions noted above are true regarding write cycle B, SDRAMSM 308 issues a cycle B activate command to open the appropriate bank and page of memory pertaining to the target memory address of write cycle B. The SDRAMSM 308 issues the cycle B activate command preferably during the write phase of cycle A. The SRDRAMSM 308 then begins the write phase of cycle B without first completing the precharge associated with cycle A. Further, the page to which the cycle A data was written is precharged while cycle B is executing. The precharge step of cycle A thus can be "hidden" during the execution of write cycle B. This principle also applies for read as well. Thus, the memory controller of the present invention can perform cycles A and B in less total time than if the cycles were run back-to-back as in FIG. 1. Moreover, memory bus utilization efficiency is increased as the percentage of time that data is communicated across the bus is increased compared to the prior art technique of FIG. 1.

Figure 6:
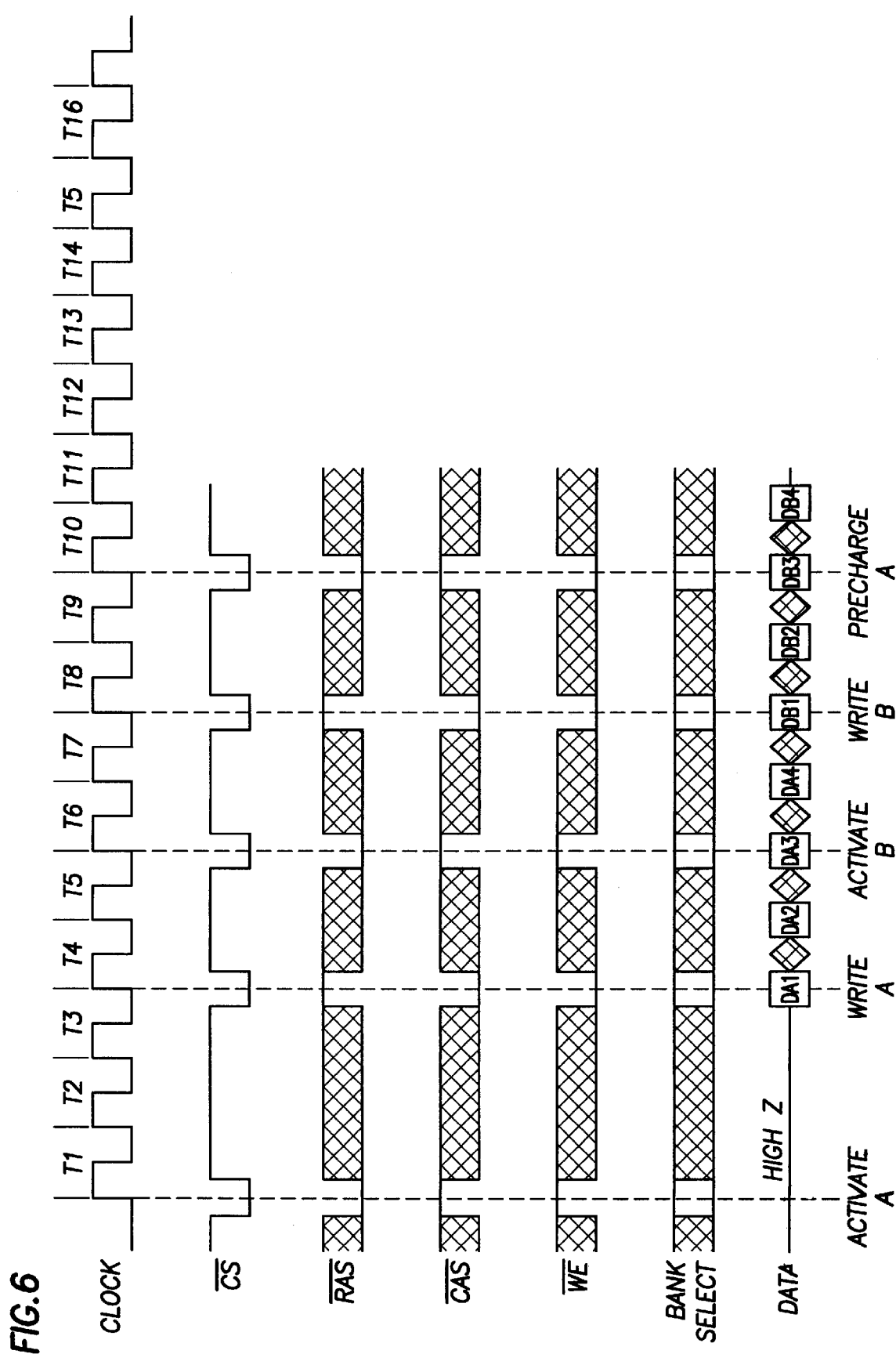
FIG. 6 is a timing diagram of two exemplary write cycles illustrating how the memory controller of FIG. 3 can "hide" a precharge command during the write command of another memory cycle.

FIG. 6 shows a timing diagram illustrating the timeline of FIG. 5 in greater detail. As is well understood by a person of ordinary skill in the art, a memory controller executes various SDRAM memory commands such as activate, read/write, and precharge commands. To generate a command, the memory controller 140 (FIG. 4) pulls CS low and encodes the type of command via the RAS, CAS, and WE signals. Preferably, the memory controller 140 encodes an activate command by holding RAS low and asserting CAS and WE to a logic high state. Further, the memory controller generates a write command pulling RAS high and holding CAS and WE low. Finally, the memory controller 140 encodes a precharge command by holding RAS and WE low and asserting CAS high.

As shown in FIG. 6, the memory controller 140 issues an activate command on the rising edge of clock cycle T1 to open the appropriate bank and page of memory in which to store the write cycle A data. After an appropriate amount of time following the activate command (a period of time dependent on the particular SDRAM device used as main memory 106), memory controller 140 begins the write cycle A write command. As shown, this write cycle begins on the rising edge of clock cycle T4. Although a write cycle may include any number of bytes or words of data desired, the preferred embodiment of the present invention permits four quad words of data to be transferred in each write cycle. Thus, the write cycle A write phase extends from the rising edge of clock cycle T4 until clock cycle T7 until cycle A quad words DA1, DA2, DA3, and DA4 are communicated to main memory 106.

During clock cycles T4–T7 in which memory controller 140 transfers write cycle A quad words DA1–DA4 to main memory 106, the memory controller activates the bank and memory associated with write cycle B. The cycle B activate command is shown to be issued on the rising edge of clock cycle T6. Once the write phase of write cycle A ends, the write phase of cycle B begins on the rising edge of clock cycle T8. During this time, the memory controller 140 provides four cycle B quad words, DB1, DB2, DB3, and DB4, to main memory 106. Finally, the memory controller 140 precharges the page of memory to which the memory controller wrote the data pertaining to write cycle A while the write phase of cycle B is executing. The cycle A precharge thus may occur on the rising edge of clock cycles T8–T11 (cycle A precharge occurs on the rising edge of clock cycle T10 in FIG. 6).

Notably, the cycle A precharge phase occurs while write cycle B data (quad words DB1–DB4) is communicated from the memory controller 140 to main memory 106. Accordingly, the memory bus 110 is kept busy with data when the cycle A precharge occurs. Bus utilization efficiency is thus increased.

Figure 7:
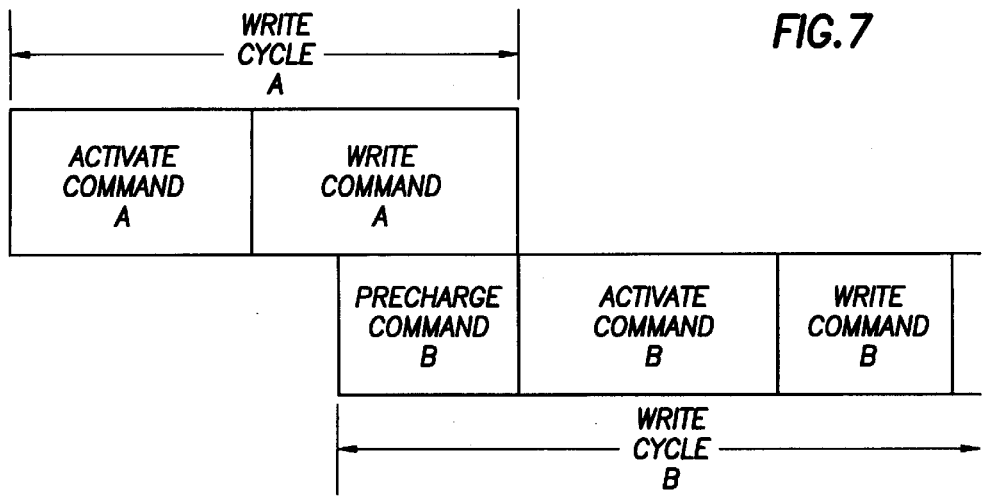
FIG. 7 is an alternative timeline to that of FIG. 5 showing the ability to begin the precharge for a subsequent cycle while the current cycle is still executing.
Figure 8:
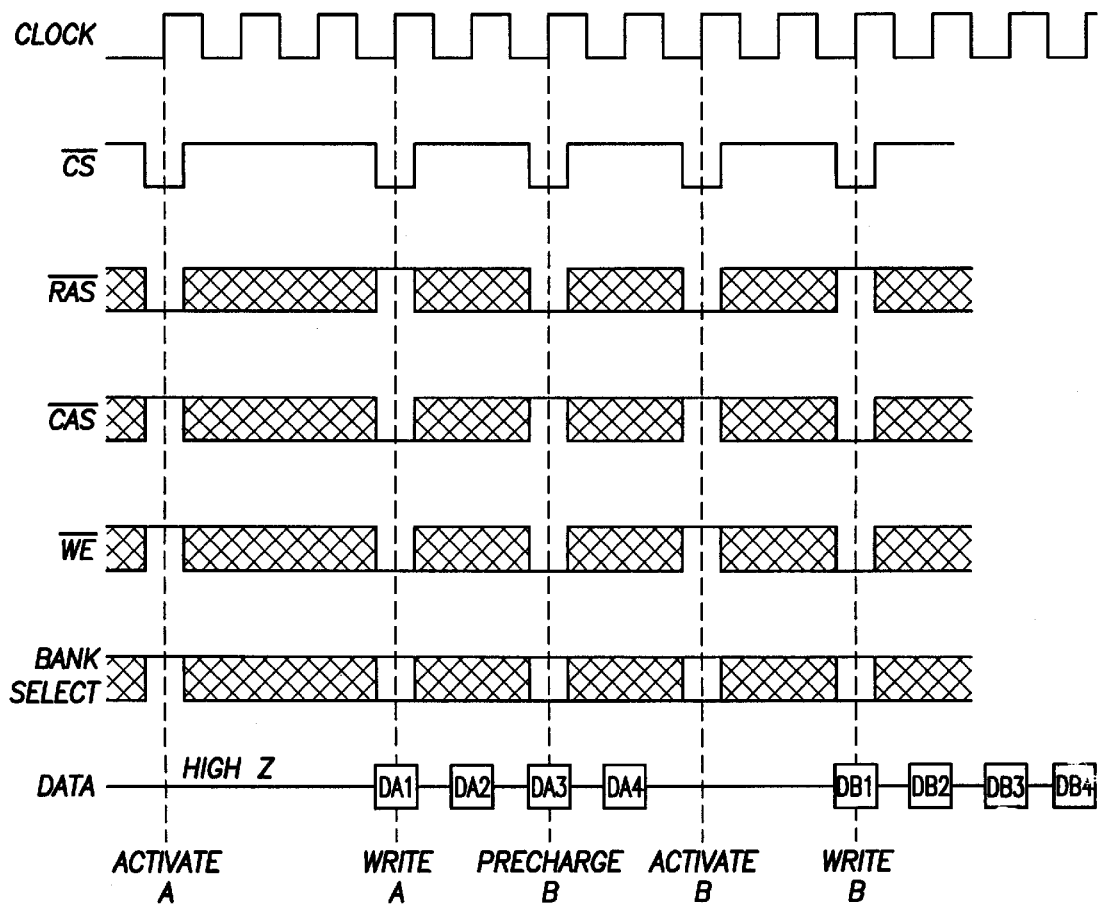
FIG. 8 is a timing diagram associated with the timeline of FIG. 7.

FIGS. 7 and 8 show a timeline (FIG. 7) and a timing diagram (FIG. 8) for implementing the aspect of condition (2) mentioned above in which the precharge command for a subsequent memory cycle begins before the current cycle completes. As shown, a precharge command (PRE B) associated with cycle B begins before cycle A ends. After PRE B ends, an Activate command (ACT B) begins followed by a write command for cycle B. The timeline shown in FIG. 7 is associated with the situation in which cycle B will result in a page miss and not a bank hit to the MRU page. FIG. 6 illustrates a timing diagram for the situation in which cycle B will result in a page miss/bank miss. The timing diagram of FIG. 8 shows the timeline of FIG. 7 in greater detail illustrating performing a precharge command of cycle B before cycle A completes.

Numerous variations and modifications will become apparent to those skilled in the art once the above disclosure is fully appreciated. It is intended that the following claims be interpreted to embrace all such variations and modifications.

What is claimed is:

1. A computer system, comprising:
    a CPU;
    a memory device; and
    a memory controller coupled between said processor and said memory device for executing CPU cycles to said memory device,
        wherein said memory controller is capable of executing a memory activate command while concurrently transferring data between said memory controller and said memory device,
        wherein said memory controller is capable of executing a memory precharge command while concurrently transferring said data,
        wherein said memory device is organized as pages that may be opened or closed by said memory controller,
        wherein said memory controller includes page hit logic for determining whether a memory access request is targeted to a page and a bank that are already open, and
        wherein said memory controller also includes least recently used (LRU) logic coupled to said page hit logic for tracking the most recently accessed n pages and banks of memory, where n is the maximum number of pages and banks said LRU logic can track.

2. The computer system of claim 1 wherein, while the memory controller is transferring said data pertaining to a current memory cycle, said page hit logic determines whether a memory address associated with a subsequent memory cycle would result in a bank miss condition.

3. The computer system of claim 2 wherein said memory controller executes an activate command associated with said subsequent memory cycle while transferring said data pertaining to said current memory cycle if said page hit logic determines that a subsequent memory cycle would result in a page miss and bank miss condition.

4. The computer system of claim 2 wherein said memory controller executes a precharge command associated with said subsequent memory cycle while transferring said data pertaining to said current memory cycle if said page hit logic determines that the subsequent memory cycle would result in a page miss and a bank hit to a bank not associated with a page most recently used by said memory controller.

5. A memory controller for controlling access to a memory device, comprising:
    a memory arbiter for deciding which memory request among one or more pending memory requests is to be executed;

page hit logic for determining whether a memory request is a hit or miss to a memory page and bank targeted by a memory request;

a least recently used (LRU) logic coupled to said page hit logic for tracking the most recently accessed n pages and banks of memory, where n is the maximum number of pages and banks said LRU logic can track; and an arbitration multiplexer for asserting control signals to said memory device to complete a memory request, said multiplexer connected to said LRU tracker state machine, said memory arbiter, and said page hit logic;

said memory controller capable of executing at least two memory requests concurrently.

6. The memory controller of claim 5 wherein said memory controller is incorporated into a bridge logic device that also includes interfaces to a CPU and at least one expansion bus.

7. The memory controller of claim 5 further including an SDRAM state machine providing memory control signals to the arbitration multiplexer and initiating SDRAM precharge, read, write, and activate commands.

8. The memory controller of claim 7 wherein said SDRAM state machine initiates a precharge command for a subsequent memory request while the memory controller is executing a current memory request, said precharge command begins in response to said page hit logic determining the existence of a page miss and a bank hit to a page that is not most recently used by said memory controller.

9. The memory controller of claim 7 wherein said SDRAM state machine initiates an activate command for a second memory request while the memory controller is executing a first memory request, said Activate command begins in response to a page miss and bank miss condition determined by said page hit logic.

10. A method of fulfilling a plurality of memory access requests, the method comprising:

receiving said plurality of memory access requests;

arbitrating to determine a current memory access request;

adding the page and bank to which the current memory access request is directed to a list of recently opened pages and banks;

controlling a memory device to fulfill the current memory access request;

during the fulfilling of the current memory access request, arbitrating to determine a next memory access request;

determining if the list of recently opened pages and banks is full;

determining if the bank to which the next memory access request is directed is in the list of recently opened pages and banks, and if the bank is absent from the list, closing a least recently used page and bank during the fulfilling of the next memory access request if the list is full.

11. The method of claim 10, further comprising:

during the fulfilling of the current memory access request, if the bank to which the next memory access request is directed is absent from the list, opening the page to which the next memory access request is directed.

12. The method of claim 11, wherein said opening is conducted during a transfer of data for the current memory request.

13. A computer system, comprising:

a CPU;

a memory device;

at least one peripheral device coupled to said memory device by an expansion bus; and a bridge logic device coupling together said CPU, said memory device, and said expansion bus, said bridge logic device including:

a memory controller for controlling access to said memory device by said CPU and a peripheral device connected to said expansion bus, wherein said memory controller is capable of executing a memory activate command while concurrently transferring data between said memory controller and said memory device, wherein said memory device is organized as pages that may be opened or closed by said memory controller, wherein said memory controller includes page hit logic for determining whether a memory access request is targeted to a page and a bank that are already open, wherein said page hit logic determines whether page miss and bank miss conditions exist, wherein said memory controller is also capable of forcing a precharge command associated with a current memory cycle to occur during a subsequent memory cycle if a list of pages that are already open is full and said page hit logic determines that said subsequent memory cycle would result in a bank miss.

14. The computer system of claim 13 wherein, while the memory controller is transferring said data pertaining to a current memory cycle, said page hit logic determines whether a memory address associated with a subsequent memory cycle would result in a bank miss condition.

15. The computer system of claim 14 wherein said memory controller executes an activate command associated with said subsequent memory cycle while transferring said data pertaining to said current memory cycle if said page hit logic determines that a subsequent memory cycle would result in a bank miss condition.

* * * * *